G. REINHARDT.
POULTRY FEEDER.
APPLICATION FILED JUNE 18, 1919.
1,430,405.
Patented Sept. 26, 1922.
2 SHEETS—SHEET 2.
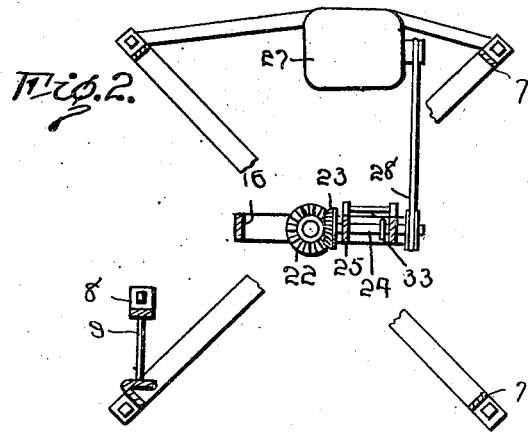
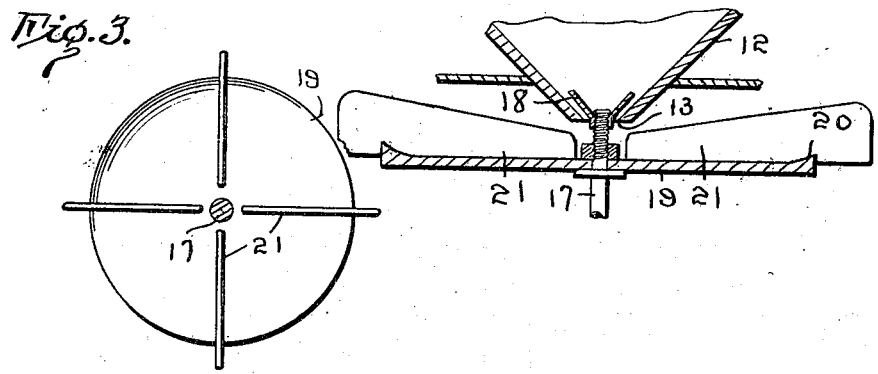
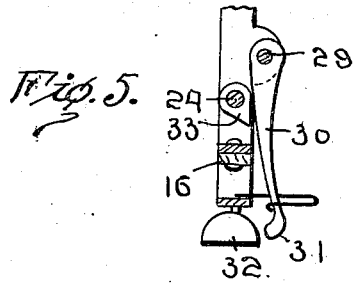
G. Reinhardt
Inventor
By Geo. P. Kimmel.
Attorney Patented Sept. 26, 1922.

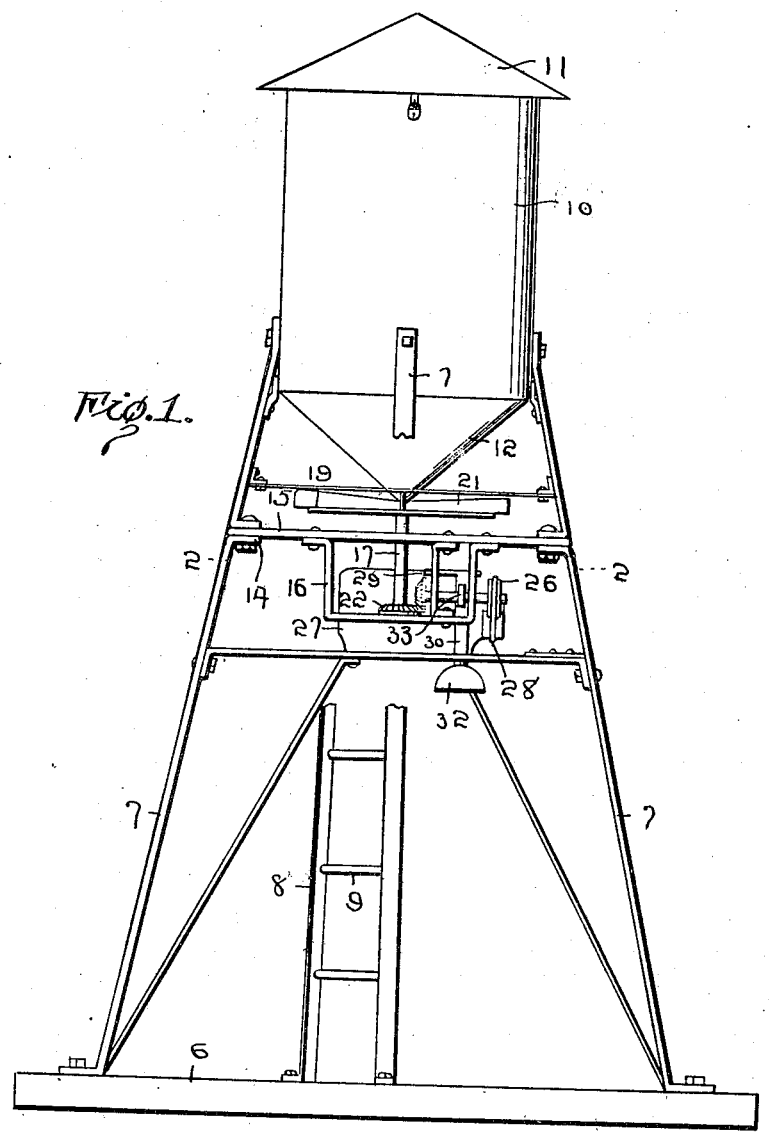

1,430,405

UNITED STATES PATENT OFFICE.

GOTTLIEB REINHARDT, OF SAGINAW, MICHIGAN.

POULTRY FEEDER.

Application filed June 18, 1919. Serial No. 305,094.

*To all whom it may concern:*

Be it known that I, GOTTLIEB REINHARDT, a citizen of the United States, residing at Saginaw, in the county of Saginaw and State of Michigan, have invented certain new and useful Improvements in a Poultry Feeder, of which the following is a specification.

This invention has for its object to provide an improved poultry feeder which is entirely automatic in operation and provided with means for scattering the feed over a relatively wide area of the ground so that a number of fowls may feed at one time.

Another object of the invention is the provision of an automatic poultry feeder in which the distributing element is of the rotary type and constitutes a valve preventing the discharge of feed from the hopper when the distributing element is not in operation.

Another object is the provision of a feeder equipped with a signal device automatically operated by the mechanism controlling the operation of the distributing element and giving audible indication of the operation of the feeder.

With these and other objects in view as will appear as the description proceeds the invention comprises the novel features of construction, accompanied by elements and arrangements of parts which will be more fully described in the following specification and set forth with particularity in the claim appended hereto.

Figure 1 represents a side elevation of the improved feeder, partly broken away, Figure 2 represents a horizontal sectional view on the line 2—2 of Figure 1.

Figure 3 represents a plan view of the rotary distributing element, the shaft being shown in section, Figure 4 represents an enlarged detail sectional view through the lower discharge terminal of the hopper and distributing element, and, Figure 5 represents a fragmental sectional view through the signal device.

Referring to the drawings in detail, wherein similar reference characters designate corresponding parts throughout the several views the numeral 6 is a suitable type of supporting plate upon which are arranged upwardly converging supporting legs 7. A supplementary upright 8 is arranged adjacent one of the supporting legs 7 and is connected therewith by a series of rungs forming a ladder facilitating access to the feed hopper or reservoir to be hereinafter more fully described.

The hopper 10 is supported between the upper terminals of the legs 7 and is provided with a removable top 11 through which the feed is introduced and with an inverted frusto conical bottom 12 constituting a discharge spout having the discharge opening 13 in its lower terminal.

Two of the diagonally opposite legs 7 are formed in sections and are provided with angular adjacent terminals 14 bolted or otherwise rigidly connected and the securing means therefor is utilized to secure a horizontally disposed support 15. A substantially U-shaped supporting bracket 16 is secured terminally to the central portion of the support 15 and a vertically disposed shaft 17 is journaled in the members 15 and 16 and is provided at its upper terminal which extends through the discharge opening 13 with external screw threads upon which is fitted an agitator carrying upwardly diverging agitating arms 18 adapted, during rotary movement of the shaft, to agitate the feed or other material lying adjacent the discharge opening 13 and thus cause such material to freely flow therethrough. A circular distributor plate 19 is secured upon the shaft 17 directly below the discharge opening 13 and is provided with a circular rib 20 at its outer edge inclined upwardly and outwardly to cause the feed moving outwardly thereon by centrifugal force to be directed upwardly and outwardly over the edge of the plate. A plurality of radially disposed upstanding edgewise disposed distributing plates 21 are also formed upon the top surface of the plate 19 and tend to increase the distributing efficiency of the plate by preventing the feed from having circular movement thereon.

The shaft 17 is provided adjacent its lower terminal with a beveled gear 22 which meshes with a corresponding gear 23 on a horizontally disposed shaft 24 mounted in one of the legs of the U-shaped bracket 16 and in a supplementary support 25 connecting the web portion of the bracket 16 with the support 15. The outer terminal of the shaft 24 is provided with a pulley 26 having connection with the drive shaft of an electric motor 27 through a belt 28 or other preferred type of power transmitting device.

A relatively short shaft 29 is journaled in the supplementary support 25 and the adjacent leg of the bracket 16 and is provided with a depending arm 30 having a head 31 at its lower terminal engageable with a bell 32 and the arm 30 is preferably constructed of spring metal in order that upon excessive vibration of the arm the head 31 is intermittently engaged with the bell 32 in order to sound the latter. A cam 33 is supported upon the shaft 24 and is arranged to engage the arm 30 at a point adjacent its pivotal axis whereby, during rotary movement of the shaft 24 the arm 30 is engaged and moved outwardly by the cam and returned to its initial position by gravity.

The electric motor 27 is connected with a suitable source of electromotive force and during operation of the motor 27 the rotary movement of the drive shaft thereof is transmitted to the shaft 24 through the belt 28 and the movement of the shaft 24 is transmitted to the shaft 17 through the gear wheels 23 and 22. The rotary movement of the agitator arms 18 in the discharge end of the hopper causes the feed to flow through the opening 13 and be deposited upon the centre portion of the distributing plate 19 and the centrifugal force developed by the rotary movement of the distributor plate causes the feed to be thrown outwardly therefrom and distributed upon the ground around the feeder. As stated, the concave form of the outer portion of the plate 19 causes an upward deflection of the grain moving outwardly thereon and increases the efficiency of the distributing element and the efficiency is further increased by the provision of the plates 21 which prevent the granular material from unduly slipping thereon. As will be understood, the rotary movement of the cam 33 vibrates the arm 30 and the lower headed terminal of the latter engaging the bell 32 sounds the latter.

What I claim is:

The combination of a support provided with an offset, of a bell suspended from the bottom of the support, a rotatable shaft journaled in the support below and in proximity to said offset, an outwardly and inwardly movable clapper depending from the offset and adapted to tap the bell on the inward movement thereof, means for pivotally supporting the clapper from the offset, and a cam mounted on the shaft and on the operation of the shaft engaging the clapper for moving the same outwardly from the bell, said clapper moving inwardly by gravity when cleared by the said cam to tap the bell.

In testimony whereof I affix my signature hereto.

GOTTLIEB REINHARDT.